United States Patent [19]

Hill

[11] Patent Number: 5,192,963
[45] Date of Patent: Mar. 9, 1993

[54] CAMERA SUSPENSION APPARATUS

[76] Inventor: Kenneth R. Hill, 517 Sunset Ave., Dallas, Tex. 75208

[21] Appl. No.: 713,790

[22] Filed: Jun. 12, 1991

[51] Int. Cl.⁵ .................................................. G03B 29/00
[52] U.S. Cl. ..................................... 354/81; 248/281.1
[58] Field of Search ................. 354/81, 293; 352/243; 248/123.1, 176, 188.4, 188.8, 159, 281.1, 292.1, 364, 648

[56] References Cited

U.S. PATENT DOCUMENTS 3,771,230 11/1973 Sartorio .......................... 248/281.1
4,241,891 12/1980 Rudolph ........................ 248/123.1
4,657,220 4/1987 Lindsay ............................ 354/293

Primary Examiner—Michael L. Gellner
Assistant Examiner—David M. Gray
Attorney, Agent, or Firm—David H. Judson

[57] ABSTRACT

A suspension apparatus that enables an operator to make fluid camera movements without holding up the weight of the camera. The apparatus includes a yoke rotatably mounted on a wheeled base for rotation about a vertical axis. A primary lever arm having having first and second ends and a medial portion is pivotably mounted on the yoke to form a fulcrum. A secondary arm has a first end pivotally attached to the second end of the primary lever arm, and a second end including a support for the camera. A counterweight arm has a first end pivotally attached to the first end of the primary lever arm. To insure balance, the apparatus includes a chain drive mechanism, responsive to pivoting of the secondary arm about the second end of the primary lever arm in a first direction, for pivoting the counterweight arm about the first end of the primary lever arm in a second opposed direction. In addition, the apparatus includes a chain drive mechanism for maintaining the camera level relative to the base as the secondary arm is pivoted about the second end of the primary lever arm.

15 Claims, 3 Drawing Sheets

CAMERA SUSPENSION APPARATUS

TECHNICAL FIELD

The present invention relates generally to support cranes and more particularly to a novel suspension apparatus for use in supporting a motion picture camera or the like in a substantially "weightless" manner.

BACKGROUND OF THE INVENTION

Camera support platforms for use in the motion picture industry are well-known in the prior art. Such cranes enable the camera operator to move in various directions within a restricted spatial area to facilitate various camera angles and shots. These devices typically include some form of jib arm mounted to a movable dolly. While these prior art cranes have proved generally useful, often they do not enable the camera operator to move the camera in a straight line without also moving the dolly. Moreover, the jib arm is normally supported in such a way as to limit the overall freedom of movement, especially adjacent the dolly. Most importantly, however, such devices require the camera operator to "hold" the weight of the camera in his or her hands. This constraint severely limits the flexibility of the operator and thus prevents the use of the camera for certain types of shots.

It would therefore be desirable to provide a camera support platform that overcomes these and other problems associated with the prior art.

BRIEF SUMMARY OF THE INVENTION

It is an object of the present invention to provide a camera suspension apparatus that isolates the weight of the camera from the camera operator and provides total freedom of movement within the spatial area adjacent the apparatus.

It is yet another object of the present invention to provide a camera suspension apparatus supported on a movable dolly or other support that allows the camera operator to work in a straight line without moving the dolly or support.

It is still another object of the invention to provide a suspension apparatus which is portable and easy to set-up and use, and which is formed of lightweight yet rigid materials for increased stability and reduced maintenance.

It is a further object to provide an improved camera suspension apparatus that includes one or more tensioner mechanisms for adjusting the degree of tension between various elements of the apparatus.

It is yet another object to provide a suspension apparatus having a plurality of arms which pivot relative to each other upon pivot assemblies that also serve as structural supports.

These and other objects of the invention are provided in a suspension apparatus that enables an operator to make fluid camera movements without holding up the weight of the camera. In the preferred embodiment, the apparatus includes a yoke rotatably mounted on a base for rotation about a vertical axis. The base may be supported on a dolly or other conventional industry-type support. A primary lever arm having having first and second ends and a medial portion is pivotably mounted on the yoke to form a fulcrum. A secondary arm has a first end pivotally attached to the second end of the primary lever arm, and a second end including a support for the camera. A counterweight arm has a first end pivotally attached to the first end of the primary lever arm. To insure balance, the apparatus includes a chain drive mechanism, responsive to pivoting of the secondary arm about the second end of the primary lever arm in a first direction, for pivoting the counterweight arm about the first end of the primary lever arm in a second opposed direction. In addition, the apparatus includes a chain drive mechanism for maintaining the camera level relative to the base as the secondary arm is pivoted about the second end of the primary lever arm.

For proper balance and stability, the primary lever arm has a predetermined length, the secondary arm has a predetermined length less than the length of the primary lever arm, and the counterweight arm has a predetermined length substantially equal to one-half the predetermined length of the secondary arm.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention maybe had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
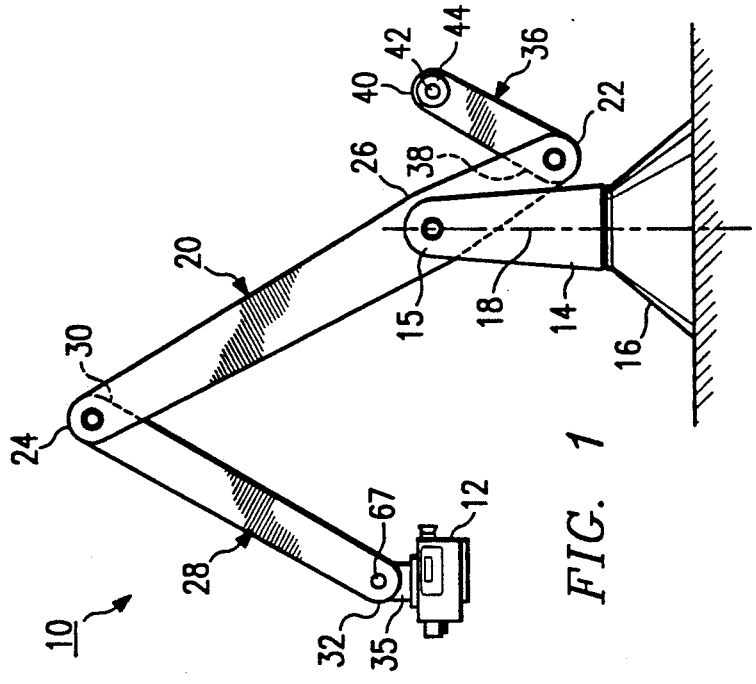
FIG. 1 is a elevational view of the camera suspension apparatus of the present invention.

Referring now to FIG. 1, an elevational view is shown of the camera suspension apparatus 10 of the present invention. The apparatus supports a camera 12 for use by a camera operator in filming a scene. For example, and not by way of limitation, the camera 12 is any type of conventional film camera such as manufactured by PanaVision or Arri, or any type of video camera. Although not shown in detail, the apparatus 10 is typically mounted on a conventional pedastal-type dolly, such as the Fisher Dolly having a center mount adapter. Other types of dollies or other standard camera support equipment are suitable as well. The apparatus 10 is manufactured in a variety of sizes depending on the nature of the application and/or the weight of the camera to be supported.

The apparatus includes a yoke 14 rotatably mounted on a base 16 for rotation about a vertical axis 18. The base may be supported on the mobile dolly (not shown). A primary lever arm 20 having first and second ends 22 and 24 and a medial portion 26 is pivotably mounted on the yoke 14 to form a fulcrum. A secondary arm 28 has a first end 30 pivotally attached to the second end 24 of the primary lever arm 20, and a second end 32 including a support 67 for a camera hanging assembly 35 to which the camera 12 is affixed. A counterweight arm 36 has a first end 38 pivotally attached to the first end 22 of the primary lever arm 20. The second end 40 of the counterweight arm 36 includes support means 42 for supporting one or more weights 44.

Figure 1A:
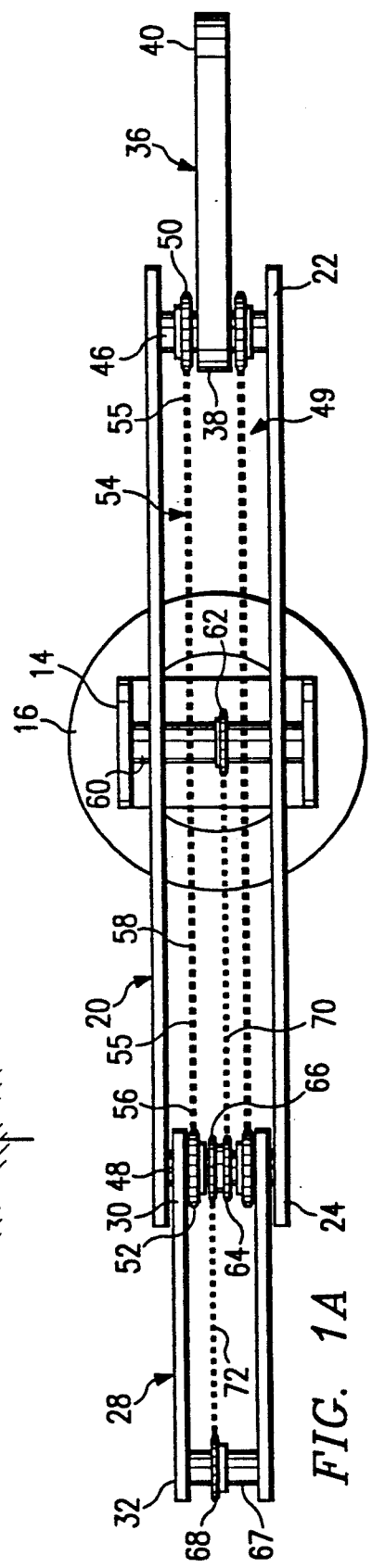
FIG. 1A is a plan view showing the various chain drive mechanisms of the camera suspension apparatus.

Referring now also to FIG. 1A, the apparatus includes a chain drive balance mechanism to provide balance and stability as the secondary arm 28 is pivoted relative to the primary lever arm 20. In particular, the first end 38 of the counterweight arm 36 is pivotally attached to the first end 22 of the primary lever arm 20 in a first rotatable support means 46 and the first end 30 of the secondary arm 28 is pivotally attached to the second end 24 of the primary lever arm 20 in a second rotatable support means 48. Preferably, a pair of chain drive mechanisms interconnect the first rotatable support means 46 to the second rotatable support means 48. One such mechanism is designated generally by the reference numeral 49. The chain drive mechanism 49 comprises a first sprocket 50 supported on the first rotatable support means 46 and a second sprocket 52 supported on the second rotatable support means 48. A first chain 54 extends around the first sprocket 50, and a second chain 56 extends around the second sprocket 52, each of the first and second chains 54 and 56 having a first end 55 and a second end (not shown) underlying the first end 55. A bar 58 extends between the first ends 55 of the first and second chains 54 and 56, and a second bar (not shown) extends between the second ends of the first and second chains and underlies the first bar. Each end of the bar is attached to one of the chain ends using an adjustable coupler for varying the tautness of the chain.

In operation, the balance mechanism is responsive to pivoting of the secondary arm about the first end of the primary lever arm in a first direction (e.g., clockwise) for pivoting the counterweight arm about the second end of the primary lever arm in a second opposed (i.e., counterclockwise) direction. Proper balance and stability is further facilitated by providing the arms 20, 28 and 36 in predetermined lengths. When the primary lever arm has a given length (e.g., 9'), the secondary arm has a length less than the length of the primary lever arm, and preferably less than the length of the distance between the medial portion and the second end of the primary lever arm. When the primary lever arm is 9' in length, the distance between the medial and second end portions is preferably 6' and the length of the secondary arm is preferably 5'. The counterweight arm 36 is then sized to be approximately one-half the length of the secondary arm 28, in this case approximately 2½" in length. The second end 40 of the counterweight arm 36 then supports weights 44 equal in combined weight to approximately twice the weight of the camera 12.

The camera 12 is maintained level relative to the upper end 15 of the yoke (and thus the base 16 and the ground) through the use of a level mechanism also shown in FIG. 1A. In particular, the primary lever arm 20 is pivotally mounted to the yoke 14 in a support 60 having a fixed sprocket 62. The first end 30 of the secondary arm 28 is pivotally attached to the second end 24 of the primary lever arm 20 in the second rotatable support means 48 as described above. The second rotatable support means 48 also has a pair of idler sprockets 64 and 66. The second end 32 of the secondary arm 28 likewise includes a support 67 having a work sprocket 68. A first chain drive mechanism 70 is engaged in the sprockets 62 and 64, and a second chain drive mechanism 72 is engaged in the sprockets 66 and 68. By continuously referencing the camera 12 to the upper end 15 of the yoke 14, the chain drive mechanisms 70 and 72 maintain the camera level relative to the base 16 as the secondary arm 28 is pivoted about the second end of the primary lever arm 20.

Figure 2:
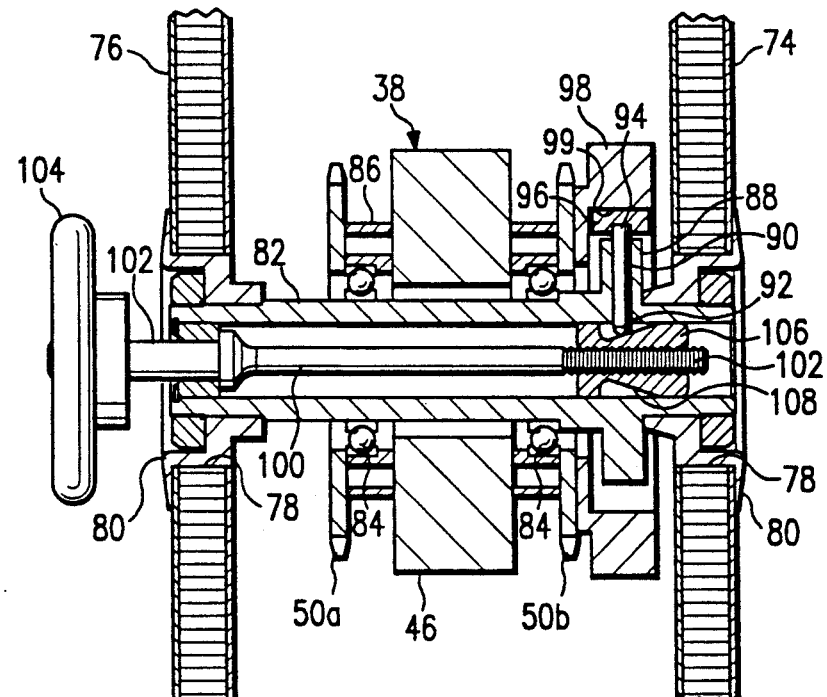
FIG. 2 is a detailed cross-sectional view through the first end of the primary lever arm.

Referring now to FIG. 2, a detailed cross-sectional view is shown of the first end 22 of the primary lever arm 20. The arm 20 includes a pair of parallel-spaced structural members 74 and 76. Each of the structural members is formed of a lightweight, yet rigid material such as honeycomb aluminum. Each of the structural members 74 and 76 of the primary lever arm include an opening 78 in the first end of the arm 20. As described above, the first end 22 of the counterweight arm 36 is pivotally attached to the first end 22 of the primary lever arm 20 in a first rotatable support means 46. The rotatable support means 46 includes a high torque insert 80 supported in each opening 78 in the first end of the primary lever arm. A cross member 82 of the support means 46 extends across the spaced structural members 74 and 76 of the primary lever arm. The rotatable support means further includes a pair of bearings 84 are supported on the cross member 82, and a bearing carrier 86 attached to the bearings 84 for rotation therewith. The first end 38 of the counterweight arm is affixed to the bearing carrier. The first and second sprockets 50a and 50b of the balance mechanism are also fixed to the bearing carrier 86.

As also seen in FIG. 2, the cross member 82 is substantially hollow and includes at least one support 88 extending transversely therefrom, the support having an opening therethrough. According to another aspect of the invention, the first end of the primary lever arm further includes a tensioner mechanism for adjusting the tension between the primary lever arm and the counterweight arm. The tensioner mechanism comprises a radially movable pushrod 90 slidably disposed within the opening extending through the support 88 of the cross member 82. The pushrod 90 has an inner end 92 and an outer end 94. A brake shoe 96 is supported on the outer end 94 of the pushrod 90. The tensioner mechanism further includes a tensioner drum 98 affixed or otherwise secured to the bearing carrier 86 and having a braking surface 99 adjacent the brake shoe 96. A shaft 100 extends through the cross member 82 and has first and second ends 100 and 102. An adjustment knob 104 is attached to the first end 102 of the shaft for rotating the shaft. The tensioner mechanism further includes a sleeve 106 attached to the second end 102 of the shaft 100. The sleeve 106 has a conical portion 108 which bears against the inner end 92 of the pushrod 90 such that the pushrod 90 is radially movable in response to rotation of the adjustment knob 104 and the shaft 100 to thereby urge the brake shoe 96 against the braking surface 99 of the tensioner drum 98.

Although not shown in detail in FIG. 2, it should be appreciated that the tensioner mechanism may include a second drum (within the space between the sprocket 50a and the inner wall of the member 76) for adding weight to the pivot joint.

Figure 3:
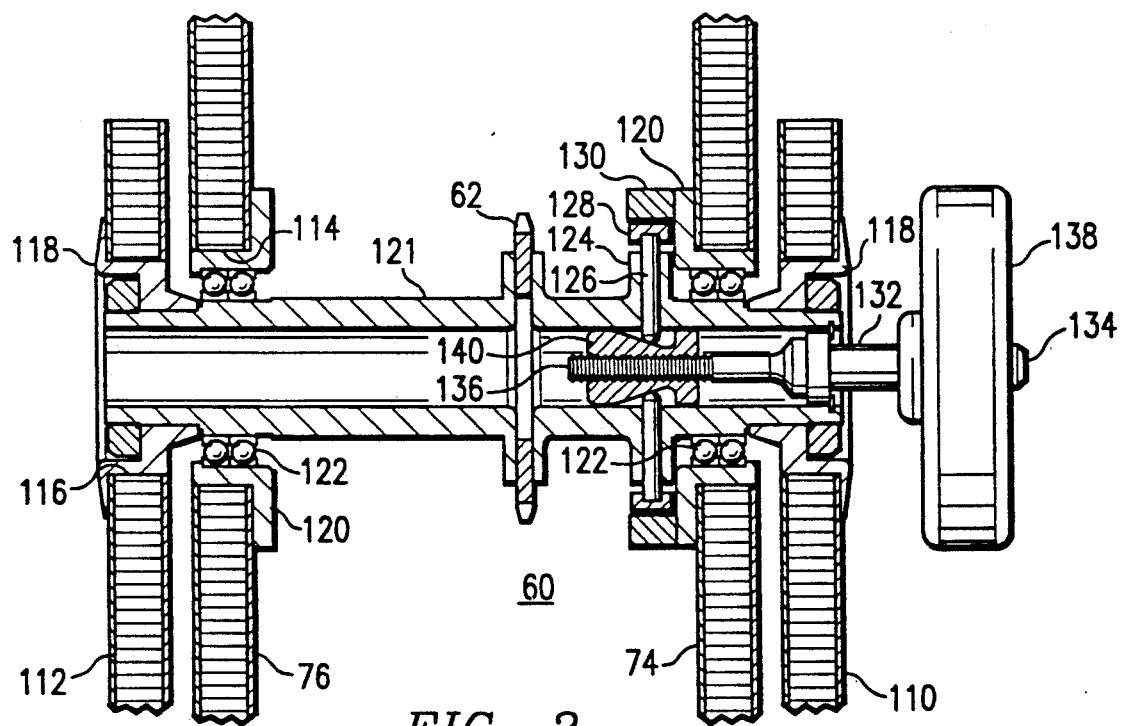
FIG. 3 is a detailed cross-sectional view through the medial portion of the primary lever arm.

Referring now to FIG. 3, a detailed cross-sectional view is shown of the pivot assembly located at the medial portion 26 of the primary lever arm. As noted above, the primary lever arm includes the pair of structural members 74 and 76. Likewise, the yoke 14 includes a pair of such structural members 110 and 112. Each of the structural members 74 and 76 of the primary lever arm include an opening 114 in the medial portion thereof. Each of the structural members 110 and 112 of the yoke 14 include an opening 116 in an upper portion 15 of the yoke. The medial portion 26 of the primary lever arm 20 is pivotally mounted on the upper portion 15 of the yoke 14 in the support 60. The support 60 includes the fixed sprocket 62 as described above with respect to FIG. 1A.

Support 60 includes an insert 118 supported in each opening 116 in the upper end 15 of the yoke 14, and a high torque insert 120 supported in each opening 114 in the medial portion of the primary lever arm. A cross member 121 extends across the spaced structural members 110 and 112 of the yoke and through the openings 116 in the structural members 76 and 78 of the primary lever arm. A bearing 122 is supported on the cross member 121 in each of the openings 114 in the structural member of the primary lever arm for enabling the primary lever arm to pivot relative to the yoke. A tensioner mechanism is also provided for adjusting the tension between the primary lever arm and the yoke.

In particular, the cross member 121 is substantially hollow and includes at least one support 124 extending transversely therefrom, the support 124 having an opening therethrough. The tensioner mechanism comprises the radially movable pushrod 126 slidably disposed within the opening extending through the support of the cross member 121, the pushrod having an inner end and an outer end. A brake shoe 128 is supported on the outer end of the pushrod, and a tensioner drum 130 is attached to one of the high torque inserts 120 of the primary lever arm. The drum 130 has a braking surface adjacent the brake shoe 128. The mechanism also includes a shaft 132 extending through the cross member and having first and second ends 134 and 136. An adjustment knob 138 is attached to the first end 134 of the shaft for rotating the shaft, and a sleeve 140 is attached to the second end 136 of the shaft. As described above, the sleeve 140 has a conical portion which bears against the inner end of the pushrod such that the pushrod is radially movable in response to rotation of the adjustment knob and the shaft to thereby urge the brake shoe against the braking surface of the tensioner drum.

Figure 4:
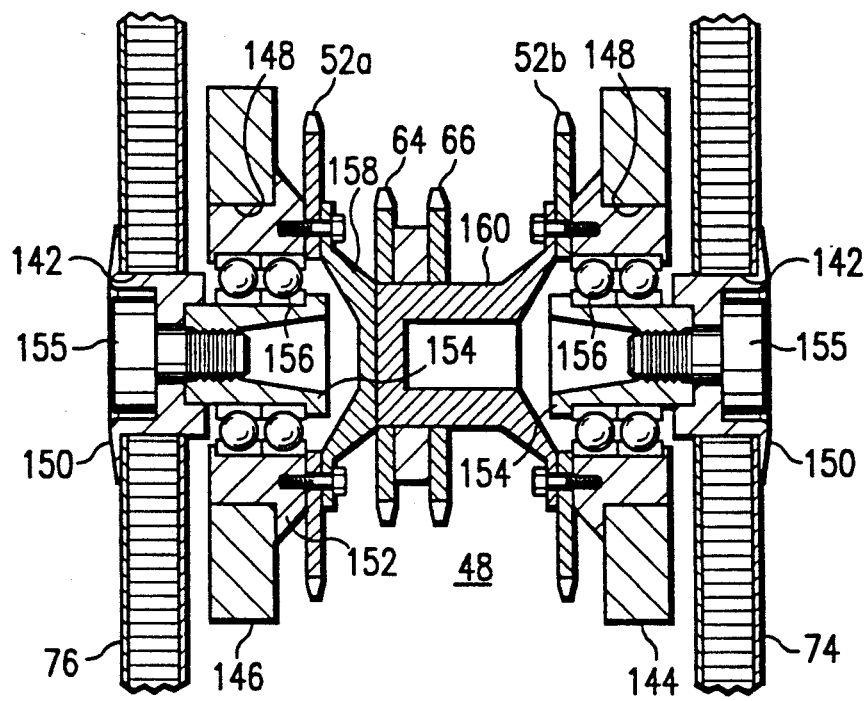
FIG. 4 is a detailed cross-sectional view through the second end of the primary lever arm.

Referring now to FIG. 4, a detailed cross-sectional view is shown of the pivot joint formed by the first end of the secondary arm and the second end of the primary lever arm. In particular, each of the structural members 74 and 76 of the primary lever arm 20 include an opening 142 in the second end or the arm. Each of the structural members 144 and 146 of the secondary arm 28 include an opening 148 in the first end of the arm 28. The first end of the secondary lever arm is pivotally attached to the second end of the primary lever arm in the second rotatable support means 48 as described above which includes an insert 150 supported in each opening 142 of the primary lever arm, and a high torque insert 152 supported in each opening 148 of the secondary arm. The support means 48 further includes a bearing retainer 154 secured in each insert 150 of the primary lever arm by a suitable threaded fastener 155. The bearing retainer extends into a space between the structural members 74 and 76. A bearing 156 is supported on each bearing retainer 154 for rotation with respect thereto.

The second rotatable support means 48 further includes a cross member having first and second portions 158 and 160, each of the portions of the cross member attached to one of the high torque inserts 152. As also shown, each portion (158 or 160) retains one of the sprockets (52a or 52b) of the balance mechanism. The bearing 156 is affixed to each high torque insert 152. The notable support means 48 extends across the spaced structural members 144 and 146 of the secondary arm 28 for enabling the secondary arm to pivot relative to the primary lever arm. The support means 48 also includes the pair of idler sprockets 64 and 66 of the camera leveling mechanism.

Figure 5:
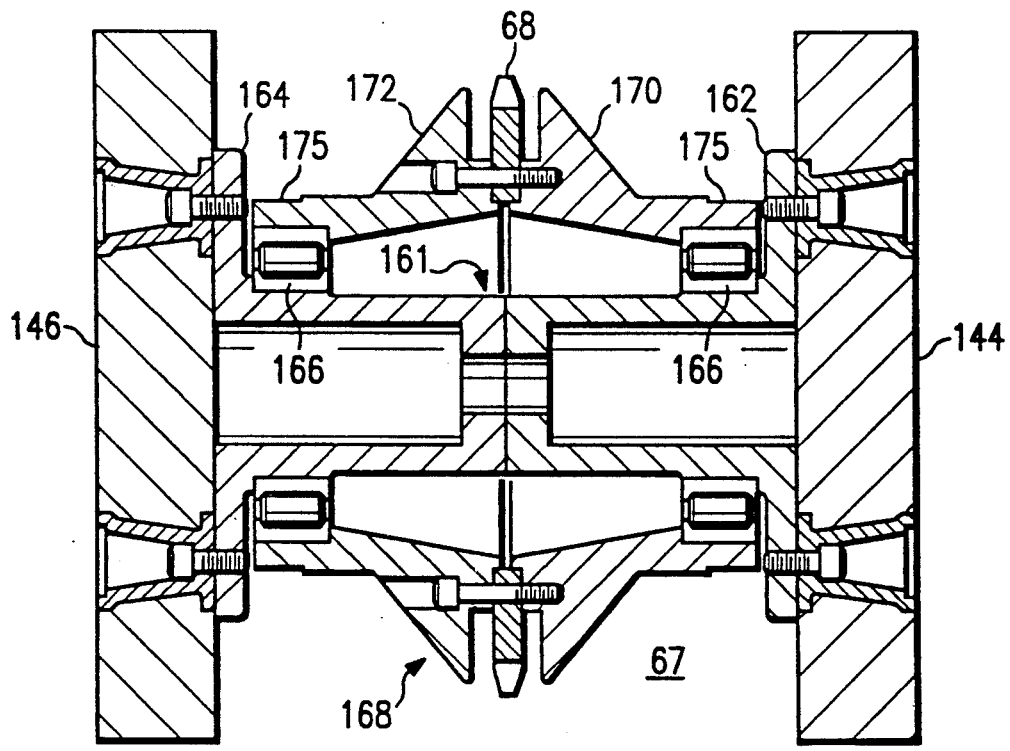
FIG. 5 is a detailed cross-sectional view through the second end of the secondary lever arm.

Referring now to FIG. 5, the camera support 67 is shown in cross-section. The support 67 comprises a cross member 161 having first and second portions 162 and 164. First portion 162 of the cross member 161 is secured to structural member 144 of the secondary arm, and second portion 164 is secured to member 146. A bearing 166 is supported on each portion of the cross member. A camera adapter connection member 168 has first and second portions 170 and 172, each of the portions of the camera adapter connection member attached to a bearing 166 for rotation therewith. The work sprocket 68 of the camera level mechanism is supported in the camera adapter connection member 168. The connection member 168 includes bearing surfaces 175 from which the camera hanging assembly is mounted.

Figure 6:
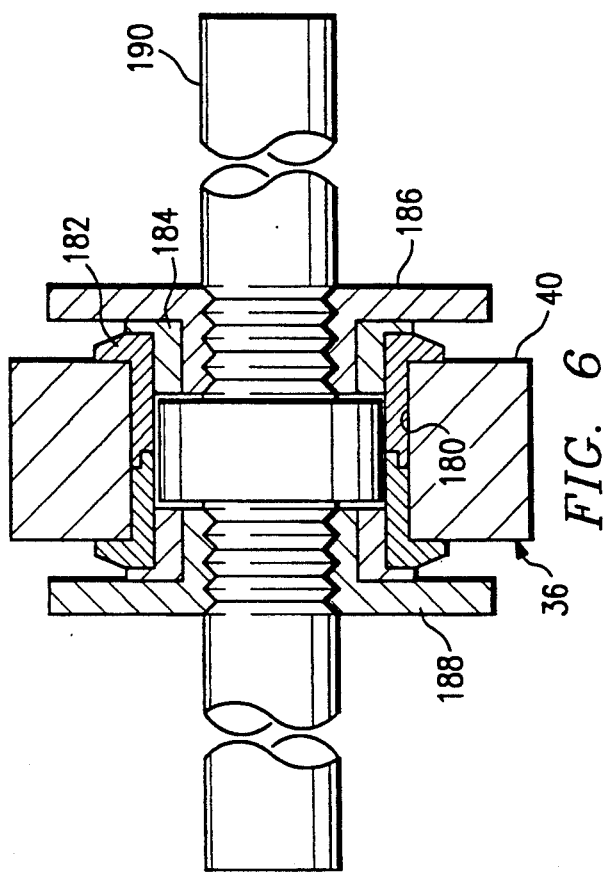
FIG. 6 is a detailed cross-sectional view through the second end of the counterweight arm.

Referring now to FIG. 6, the second end 40 of the counterweight arm 36 is shown in cross-section. The weights arm includes an opening 180 in which an insert 182 is supported. A bushing 184 is attached to the insert 182 and supports a pair of nut members 186 and 188 which are threadably secured to a weight support shaft 190. Barbell-type weights 44 are then supported on one or both sides of the shaft 190 and used to balance the weight of the camera. Preferably, the amount of weight is approximately twice the weight of the camera.

Although not shown in detail, preferably the yoke 14 is rotatably mounted on the base 16 in a support means including a tensioner mechanism for adjusting the tension between the yoke and the base. The tensioner is similar to the mechanisms shown in FIGS. 2–3.

The camera suspension apparatus as described herein has significant advantages over the prior art. Most importantly, the apparatus isolates the weight of the camera from the camera operator and provides total freedom of movement within the spatial area adjacent the apparatus, especially adjacent the dolly. The apparatus allows the camera operator to work in a straight line without moving the dolly. It is portable and easy to set-up and use, and the apparatus is formed of lightweight yet rigid materials for increased stability and reduced maintenance. The device includes a plurality of tensioner mechanisms for adjusting the degree of tension between various elements of the apparatus. These mechanisms insure that the camera, once placed, remains extremely stable; the camera operator thus can move the the camera to a predetermined position quickly and accurately without fear that the camera will shift position upon the operator's release. The apparatus also uniquely provides a plurality of arms which pivot relative to each other upon pivot assemblies that also serve as structural supports.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. Camera suspension apparatus supported on a base, comprising:
   a yoke rotatably mounted on the base for rotation about a vertical axis, the yoke including a pair of parallel-spaced structural members;
   a primary lever arm having first and second ends and a medial portion pivotably mounted on the yoke to form a fulcrum, the primary lever arm including a pair of parallel-spaced structural members;
   a counterweight arm having first and second ends, the first end of the counterweight arm pivotally attached to the first end of the primary lever arm;
   each of the structural members of the primary lever arm including an opening in the first end thereof and wherein the first end of the counterweight arm is pivotally attached to the first end of the primary lever arm in a first support means comprising:
      a high torque insert supported in each opening in the first end of the primary lever arm;
      a cross member extending across the spaced structural members of the first end of the primary lever arm;
         a bearing supported on the cross member; and
         a bearing carrier attached to the bearing for rotation therewith, the bearing carrier for supporting the first end of the counterweight arm;
   a secondary arm having first and second ends, the first end of the secondary arm pivotally attached to the second end of the primary lever arm, the secondary arm including a pair of parallel-spaced structural members;
   means for supporting a camera from the second end of the secondary arm;
   balance means including first and second sprockets mounted on the bearing carrier of the first support means, the balance means responsive to pivoting of the secondary arm about the second end of the primary lever arm in a first direction for pivoting the counterweight arm about the first end of the primary lever arm in a second opposed direction; and
   level means for maintaining the camera level relative to the base as the secondary arm is pivoted about the second end of the primary lever arm.

2. The camera suspension apparatus as described in claim 1 wherein the cross member is hollow and includes at least one support extending transversely therefrom, the support having an opening therethrough.

3. The camera suspension apparatus as described in claim 2 wherein the first end of the primary lever arm further includes:
   a tensioner mechanism for adjusting the tension between the primary lever arm and the counterweight arm.

4. The camera suspension apparatus as described in claim 3 wherein the tensioner mechanism comprises:
   a radially movable pushrod slidably disposed within the opening extending through the support of the cross member, the pushrod having an inner end and an outer end;
   a brake shoe supported on the outer end of the pushrod;
   a tensioner drum attached to the bearing carrier and having a braking surface adjacent the brake shoe;
   a shaft extending through the cross member and having first and second ends;
   an adjustment knob attached to the first end of the shaft for rotating the shaft; and
   a sleeve attached to the second end of the shaft, the sleeve having a conical portion which bears against the inner end of the pushrod such that the pushrod is radially movable in response to rotation of the adjustment knob and the shaft to thereby urge the brake shoe against the braking surface of the tensioner drum.

5. The camera suspension apparatus as described in claim 1 each of the structural members of the primary lever arm include an opening in the medial portion thereof and wherein each of the structural members of the yoke include an opening in an upper portion thereof, wherein the medial portion of the primary lever arm is pivotally mounted on the upper portion of the yoke in a second support means comprising:
   an insert supported in each opening in the upper end of the yoke;
   a high torque insert supported in each opening in the medial portion of the primary lever arm;
   a cross member extending across the spaced structural members of the yoke and through the openings in the structural members of the primary lever arm;
   a bearing supported on the cross member in each of the openings in the structural member of the primary lever arm for enabling the primary lever arm to pivot relative to the yoke; and
   a tensioner mechanism for adjusting the tension between the primary lever arm and the yoke.

6. The camera suspension apparatus as described in claim 5 wherein the cross member is hollow and includes at least one support extending transversely therefrom, the support having an opening therethrough.

7. The camera suspension apparatus as described in claim 6 wherein the tensioner mechanism comprises:
   a radially movable pushrod slidably disposed within the opening extending through the support of the cross member, the pushrod having an inner end and an outer end;
   a brake shoe supported on the outer end of the pushrod;
   a tensioner drum attached to one of the high torque inserts of the primary lever arm and having a braking surface adjacent the brake shoe;
   a shaft extending through the cross member and having first and second ends;
   an adjustment knob attached to the first end of the shaft for rotating the shaft; and
   a sleeve attached to the second end of the shaft, the sleeve having a conical portion which bears against the inner end of the pushrod such that the pushrod is radially movable in response to rotation of the adjustment knob and the shaft to thereby urge the brake shoe against the braking surface of the tensioner drum.

8. The camera suspension apparatus as described in claim 5 wherein the cross member of the second support means supports a sprocket of the level means.

9. The camera suspension apparatus as described in claim 1 wherein each of the structural members of the primary lever arm include an opening in the second end thereof and wherein each of the structural members of the secondary arm include an opening in the first end thereof, wherein the first end of the secondary lever arm is pivotally attached to the second end of the primary lever arm in a third support means comprising:
- an insert supported in each opening in the second end of the primary lever arm;
- a high torque insert supported in each opening in the first end of the secondary arm;
- a bearing retainer secured in each insert of the primary lever arm and extending into a space between the structural members of the primary lever arm by a predetermined distance;
- a bearing supported on each bearing retainer and adapted for rotation therewith;
- a cross member having first and second portions, each of the portions of the cross member attached to a high torque insert and supported on each bearing, wherein the cross member extends across the spaced structural members of the secondary arm for enabling the secondary arm to pivot relative to the primary lever arm; and
- a pair of idler sprockets of the level means supported on the cross member.

10. The camera suspension apparatus as described in claim 1 wherein the means for supporting a camera from the second end of the secondary arm comprises:
- a cross member having first and second portions;
- a bearing supported on each portion of the cross member;
- a camera adapter connection member having first and second portions, each of the portions of the camera adapter connection member attached to a bearing for rotation therewith; and
- a sprocket of the level means supported in the camera adapter connection member.

11. Camera suspension apparatus supported on a base, comprising:
- a yoke rotatably mounted on the base for rotation about a vertical axis;
- a primary lever arm having first and second ends and a medial portion pivotably mounted on the yoke to form a fulcrum;
- a secondary arm having first and second ends, the first end of the secondary arm pivotally attached to the second end of the primary lever arm;
- a counterweight arm having first and second ends, the first end of the counterweight arm pivotally attached to the first end of the primary lever arm; wherein the first end of the counterweight arm is pivotally attached to the first end of the primary lever arm in a first rotatable support means and the first end of the secondary arm is pivotally attached to the second end of the primary lever arm in a second rotatable support means;
- means for supporting a camera from the second end of the secondary arm;
- balance means, responsive to pivoting of the secondary arm about the second end of the primary lever arm in a first direction for pivoting the counterweight arm about the first end of the primary lever arm in a second opposed direction. the balance means including at least one chain drive means interconnecting the first rotatable support means to the second rotatable support means, the chain drive means comprising:
  - a first sprocket supported on the first rotatable support means and a second sprocket supported on the second rotatable support means;
  - a first chain extending around the first sprocket, and a second chain extending around the second sprocket, each of the first and second chains having first and second ends; and
  - a first bar extending between the first ends of the first and second chains, and a second bar extending between the second ends of the first and second chains; and
- level means for maintaining the camera level relative to the base as the secondary arm is pivoted about the second end of the primary lever arm.

12. Camera suspension apparatus supported on a base, comprising:
- a first arm pivotally mounted to the base and having first and second ends;
- a second arm pivotally connected at a first end thereof to said first arm second end by first pivot means;
- a third arm pivotally connected at a first end thereof to said first arm first end by second pivot means;
- means for supporting a camera from a second end of the second arm;
- fluid motion chain drive means, responsive to pivoting of the second arm about the first arm second end in a first direction as the camera is moved, for pivoting the third arm about the first arm first end in a second opposed direction; and
- tensioner means supported in the first pivot means for selectively setting a desired amount of tension between the first and second arms as the arms are pivoted with respect to each other during camera movement.

13. The camera suspension apparatus as described in claim 12 wherein the base includes a yoke mounted for rotation about a vertical axis and wherein the first arm is pivotally connected at a medial portion thereof to the yoke by third pivot means.

14. The camera suspension apparatus as described in claim 13 further including tensioner means supported in the third pivot means for selectively setting a desired amount of tension between the yoke and the first arm during camera movement.

15. The camera suspension apparatus as described in claim 12 further including level means for maintaining the camera level relative to the base as the second arm is pivoted about the first arm second end.

* * * * *